Figure 1:
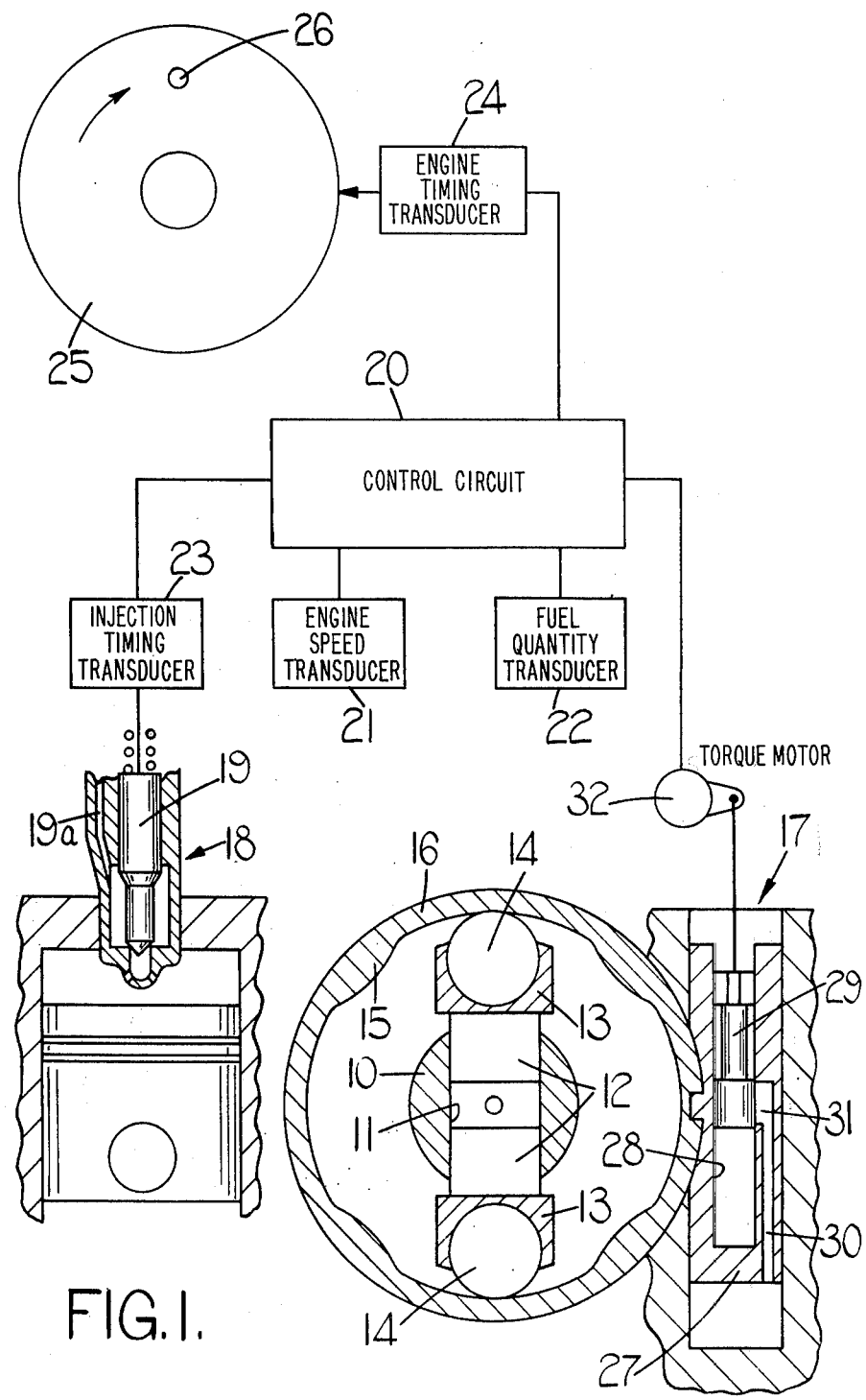

United States Patent [19]

Nicolls

[11] 4,033,310

[45] July 5, 1977

[54] FUEL PUMPING APPARATUS WITH TIMING CORRECTION MEANS

[75] Inventor: Wilfrid Edward Walter Nicolls, East Molesey, England

[73] Assignee: C.A.V. Limited, Birmingham, England

[22] Filed: Oct. 4, 1973

[21] Appl. No.: 403,717

[30] Foreign Application Priority Data

Oct. 4, 1972   United Kingdom ............ 45722/72

[52] U.S. Cl. ................... 123/139 AP; 123/139 E; 123/139 AQ
[51] Int. Cl.² .......................................... F02M 39/00
[58] Field of Search .... 123/32 EA, 139 E, 139 AP, 123/139 AQ, 139 BD

[56] References Cited

UNITED STATES PATENTS

| 3,587,540 | 6/1971 | Hofmann et al. ............ 123/139 AQ |
| 3,633,559 | 1/1972 | Ehem .............................. 123/117 R |
| 3,713,427 | 1/1973 | Adler .............................. 123/139 E |
| 3,716,035 | 2/1973 | Adler et al. ................... 123/32 EA |
| 3,738,339 | 6/1973 | Huntzinger et al. ........... 123/117 R |
| 3,742,918 | 7/1973 | Murtin et al. .................. 123/32 EA |
| 3,749,070 | 7/1973 | Oishi et al. .................... 123/117 R |
| 3,750,632 | 8/1973 | Zechnau ........................ 123/117 R |
| 3,779,225 | 12/1973 | Watson et al. ................. 123/139 E |
| 3,796,197 | 3/1974 | Locher et al. .................. 123/117 R |
| 3,809,029 | 5/1974 | Wakamatse et al. .......... 123/32 EA |
| 3,815,564 | 6/1974 | Suda et al. ..................... 123/139 AQ |

FOREIGN PATENTS OR APPLICATIONS 1,281,751   10/1968   Germany ..................... 123/139 AP

*Primary Examiner*—C. J. Husar
*Assistant Examiner*—Paul Devinsky

[57] ABSTRACT

A fuel pumping apparatus comprises an injection pump including a cam angularly movable to vary the timing of injection of fuel, the cam being operated by a servo-mechanism which is controlled by an electrical torque motor. The supply of electrical energy to the torque motor is controlled by a control circuit which receives signals indicative of the speed of and the load on the engine, and also a signal from a transducer indicative of the actual timing of injection of fuel to the engine and also a signal from a transducer indicating the position of the parts of the engine. The control circuit processes the signals to provide for variation in the timing of injection of fuel in accordance with the speed and the load, and also checks that the actual instant of injection is correct.

11 Claims, 2 Drawing Figures

FUEL PUMPING APPARATUS WITH TIMING CORRECTION MEANS

This invention relates to liquid fuel pumping apparatus for supplying fuel to an internal combustion engine and of the kind comprising in combination, an injection pump driven by the engine for supplying fuel in timed relationship to the engine, first means for adjusting the quantity of fuel suplied to the engine at each injection stroke of the injection pump and second menas operable to adjust the timing of delivery of fuel by the pump to the engine.

According to the invention an apparatus of the kind specified comprises third means for providing an electrical signal indicative of the actual instant at which delivery of fuel takes place to the engine and fourth means for supplying to a control circuit a periodic signal indicative of the position of the parts of the engine, said control circuit upon the receipt of said signals acting if the timing of injection of fuel is incorrect, to control said second means to adjust the timing of delivery of fuel by the pump to the engine.

According to a further feature of the invention the apparatus includes a speed transducer for supplying to the control circuit an electrical signal representing the speed of the engine.

According to a further feature of the invention the apparatus includes a further transducer for supplying to the control circuit an electrical signal representing the quantity of fuel supplied to the engine.

According to a further feature of the invention said third means comprises a transducer associated with an injection nozzle of the engine.

Figure 2:
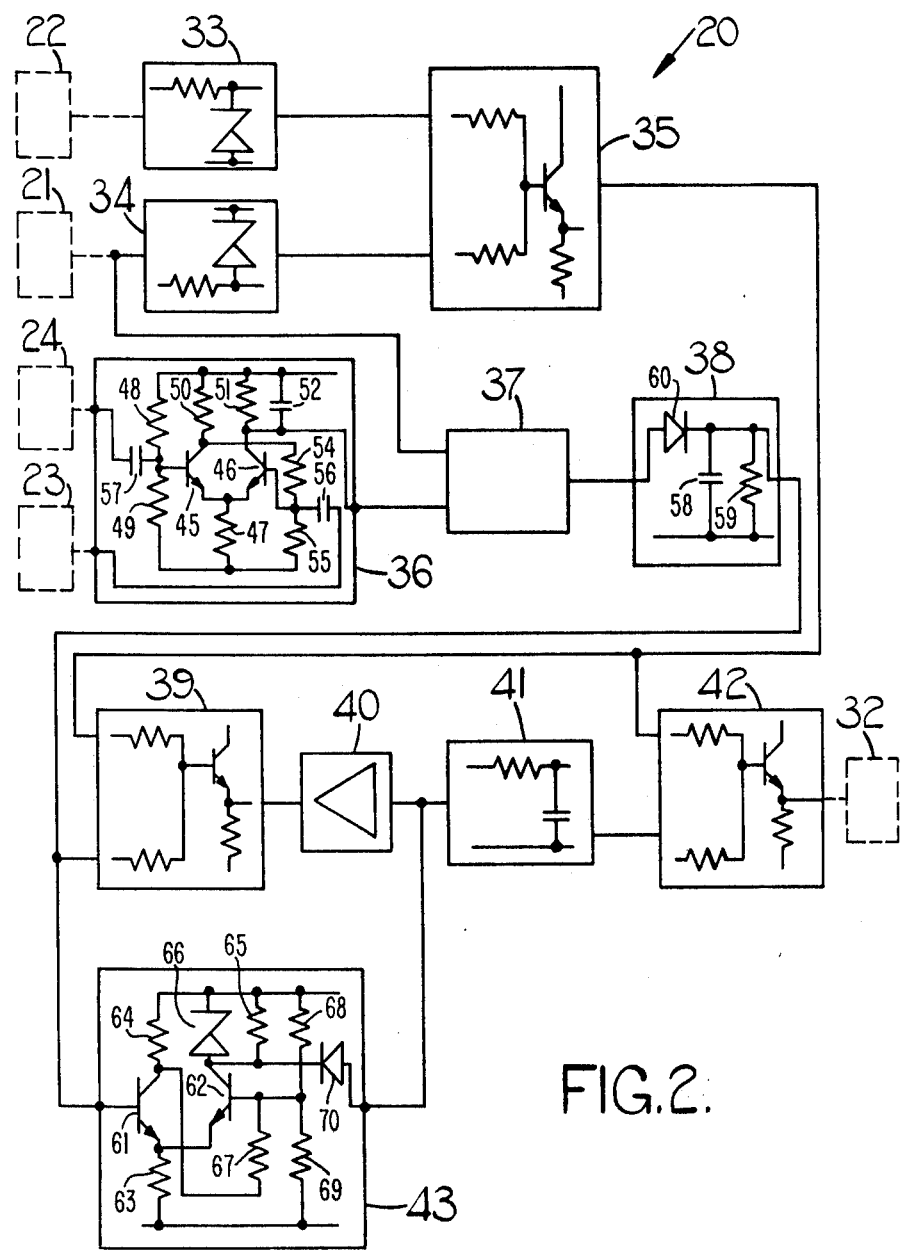

One example of a fuel pumping apparatus in accordance with the invention will now be described with reference to the accompanying drawing in which:

FIG. 1 is a block diagram of the apparatus, and
FIG. 2 is a block diagram showing the contents of one of the blocks of FIG. 1.

With reference to FIG. 1 of the drawings the fuel pumping apparatus comprises a rotary member 10 driven in synchronism with the engine as in the particular example, one half of the engine speed. Formed in the member 10 is a transversely extending bore 11 in which is mounted a pair of pumping plungers 12. Located at the outer end of the plungers are shoes 13 which carry rollers 14. The rollers co-act with the cam lobes 15 formed on the internal periphery of an annular cam ring 16 the angular setting of which can be adjusted by a device 17 which as will be explained, is hydraulically actuated in response to an electrical signal. However, it may be actuated directly by the electrical signal.

The space between the plungers 12 in known manner, forms the pumping chamber of the injection pump and it communicates with a delivery passage extending to the periphery of the member 10 and arranged to register in turn and during inwards movement of the plungers, with in the present example, four equiangularly spaced outlet ports which are formed in a body part serving to mount the rotary member 10 and also the annular cam 16.

The outlet ports communicate with injection nozzles diagrammatically shown at 18, one such injection nozzle being provided for each engine cylinder. Each injection nozzle includes a fuel pressure operated valve member 19 which when fuel is supplied through a passage 19a in the nozzle unit by the injection pump, moves against the action of its spring loading to permit fuel flow into the cylinder. The apparatus also includes a fuel metering device which controls the quantity of fuel supplied to the pumping chamber of the injection pump during the filling strokes thereof. The portion of the apparatus thus far described with the exception of the device 17 is very well known and known forms of apparatus of this type include an hydraulic or a mechnical system whereby the timing of the supply of fuel to the engine can be varied in accordance with the speed of the engine and in certain circumstances, the load on the engine as indicated by the quantity of fuel which is being supplied to the engine. Also as explained such systems are not particularly accurate and certainly are not sufficiently accurate to meet the stringent requirements of the recent laws regarding emission of smoke from the engine exhausts. In order to improve the accuracy of timing the apparatus includes a control circuit 20 which provides an output signal for controlling the operation of the device 17.

The device 17 is a follow-up hydraulic servo-system and includes a fluid pressure operable piston 27 slidable within a cylinder and coupled to the cam ring 15. The piston 27 is provided with a blind bore 28 in which is located a landed valve member 29. The closed end of the bore 28 is supplied with liquid under pressure from a source not shown and the valve member 29 controls the flow of this liquid to the adjacent end of the cylinder containing the piston 27. For this purpose a passage 30 is formed in the piston and which communicates with the aforesaid end of the cylinder, the passage opening to a port 31 formed in the bore 28. The port 31 in a position of equilibrium is covered by one of the lands of the valve member. If however the valve member is moved upwardly fluid is admitted to the end of the cylinder and the piston is moved upwardly to establish a new equilibrium position. If on the other hand the valve member is moved downwardly the port 31 is uncovered to the groove in the valve member and fluid can escape from the aforesaid end of the cylinder, the fluid flowing along a groove formed in the other land to a drain.

The position of the valve member 29 is determined by a torque motor 32 which is supplied with an electrical signal and which has an output member directly coupled to the valve member.

Various signals are applied to the control circuit 20 as will be described so that the desired timing of injection of fuel to the engine is achieved.

The control circuit is supplied with a signal representative of the engine speed by means of a transducer 21. In addition the control circuit is provided with a signal by means of a device 22, representing the quantity of fuel which is being supplied to the engine at each injection stroke. Two additional signals are also supplied to the control circuit and one of these is obtained from a transducer 23 associated with one of the nozzle units 18. This transducer provides the signal indicative of the instant of injection of fuel to the engine. The other signal which is supplied to the control circuit 20 is derived from a transducer 24 which is placed in close proximity to a part 25 rotating in this case at engine speed. The part is provided with a mark indicated at 26 and which when passing the transducer 24 causes the latter to provide a pulse.

It will be apreciated that the control circuit by virtue of the transducers is provided with information regarding the actual instant of injection, the position of the engine parts, the speed of the engine, and also the quantity of fuel which is being supplied to the engine. The control circuit to be described analyses the signals to provide the desired timing of injection of fuel taking into account the engine speed and load and also checks that the desired timing is obtained by taking into consideration the signals supplied by transducers 23 and 24. In other words not only is the intended timing of injection carefully determined but also the actual timing of injection is controlled.

It will be understood that the part 25 may rotate at twice the speed of the engine and in this case transducers could be applied to each injection nozzle. In the case where the part 25 rotates at the speed of the engine and only one transducer 23 is provided it will be appreciated that only alternative signals from the transducer 24 will be required for comparison purposes. Clearly a pair of transducers 23 may be utilized, the two transducers being associated with the nozzles which are connected to outlet ports diametrically opposite each other about the periphery of the distributor 10.

The control circuit 20 is shown in block form in FIG. 2, the content of each block being indicated in most cases, as an electrical circuit. Considering the circuit in detail, the output from the device 22 is supplied to a limiter 33 the function of which is to ensure that the timing of injection of fuel is subject to adjustment in accordance with the loading of the engine only when the load is below a predetermined value. Moreover, the output of the transducer 21 is applied to a further limiter 34 and the function of this is to ensure that the timing of injection of fuel is subject to adjustment in accordance with the speed of the engine only when the speed is above a predetermined value.

The outputs from the limiters 33, 34 are supplied to an adder 35 to produce a signal which apart from the conditions mentioned above, is proportional to the speed of and the load on the engine.

The outputs from the transducers 23, 24 comprises pulses which are applied to a timing circuit 36, the timing circuit is turned on by the signal from the transducer 24 and turned off by the signal from the transducer 23. The timing circuit 36 comprises n-p-n transisters 45, 46 having a common emitter resistor 47 which is connected to the negative terminal of a source of supply not shown. Also provided are a pair of series connected resistors 48, 49 the ends of which are connected to the positive and negative terminals of the source of supply and a point intermediate the resistors is connected to the base of transistor 45. The collectors of transistors 45 and 46 are connected to the positive terminal of the source of supply by way of resistors 50, 51 and resistor 51 is bridged by a capacitor 52. The collector of transistor 45 is connected to the negative terminal by way of series connected resistors 54, 55 and a point intermediate these resistors is connected to the base of transistor 46. Moreover, this point is also connected by way of a capacitor 56 to the transducer 23 and a capacitor 57 connects the transducer 24 to the base of transistor 45.

In operation, a pulse from transistor 24 turns on transistor 45 which in turn turns transistor 46 off so that the collector potential of transistor 46 is substantially equal to the potential of the positive terminal of the source of supply. The output from the timing circuit is taken from the collector of transistor 46. When the pulse is produced by the transducer 23 transistor 46 is turned on so that the collector voltage of the transistor falls to a value determined by the collector emitter resistance of the transistor 46, the resistor 51 and the resistor 47. The action of transistor 46 turning on turns transistor 45 off. The output from the timing circuit 36 is therefore a signal representative of the time in say milliseconds between the generation of the two pulses by the ytransducers. This signal is converted into a signal providing an indication of the interval between the generation of the two pulses in terms of degrees of engine rotation, by multiplying in a multiplier 37, the signal from the timing circuit 36 by the signal from the transducer 21. The multiplier 37 is a standard component and since the signal from the timing circuit is of a pulsed nature a memory circuit 38 is provided and this provides a continuous signal.

The memory circuit 38 comprises a capacitor 58 having in parallel therewith a resistor 59. The capacitor is charged by way of a diode 60 by the output from the multiplier circuit 37 and is discharged by the resistor 59. The capacitor therefore acts to memorize the signal produced by the multiplier 37.

The signal from the memory 38 is compared with the signal from the adder 35 is a comparator 39 and an error signal is produced which is representative of the error in the timing of injection of fuel, it being appreciated that the output from the adder 35 is representative of what the timing should be whilst the output from the memory 38 is representative of the actual timing.

The aforesaid error signal is amplified in an amplifier 40 and is applied to a block 41 which introduces a time constant. The purpose of introduction of the time constant is to limit the amount of correction of the timing which can take place between successive sampling. If the time constant is not introduced then the circuit could cause the timing to be fully advanced or fully retarded if for instance one assumes that at one sampling the timings were slightly retarded. It will be understood however, that the hydro-mechanical portion of the system that is the valve 29 and piston 27, may have a long enough time constant to make the provision of the block 41 unnecessary.

The output from the block 41 is applied to an adder 42 which also receives the signal from the adder 35 and the output from the adder 42 is applied to the torque motor 32. The output from adder 35 is of course the main command signal and in the event of error, correction takes place because of the signal from the block 41.

It will be appreciated that in some instances as determined by the operator and the engine speed governor the engine can be operating at say half speed with no fuel being supplied. In these circumstances there will be no signal from the transducer 23 and the effect of this is that the timer 36 is not switched off. This provides a signal indicative of the fact that the timing is delayed and the effect of this would be to move the piston 27 to the fully advanced position. The mute block 43 prevents this by sensing when the signal from the memory 38 attains a predetermined value indicative of no injection of fuel, and operates to reduce the signal from the amplifier 40 to zero.

The mute block 43 comprises a pair of n-p-n transistors 61, 62 the emitters of which are connected to the negative terminal of a source of supply by way of a resistor 63. The collector of transistor 61 is connected to the positive terminal of the source of supply by way of a resistor 64 and the collector terminal of transistor 62 is connected to the positive terminal by way of a resistor 65 which is bridged by a Zener diode 66. Moreover, the collector terminal of transistor 61 is connected to the base terminal of transistor 62 by way of a resistor 67 and in addition the base terminal of transistor 62 is connected to a point intermediate a series connected pair of resistors 68, 69 connected at their opposite ends respectively, to the positive and negative terminals of the source of supply. The collector of transistor 62 is connected to the cathode of a clamping diode 70 the anode of which is connected to the output of the amplifier 40. The base terminal of transistor 61 receives the voltage developed across the capacitor 58 of the memory circuit 38.

In operation, transistor 61 is maintained in the conducting state by the voltage developed across the capacitor 58. As a result of the conduction of transistor 61 transistor 62 is maintained in the off condition so that the diode 70 is reverse biased and in no way influences the signal passing between the amplifier 40 and the block 41. If however the signal across the capacitor 58 should fall then transistor 61 will cease to conduct and transistor 62 will conduct and its collector voltage will fall to a value determined by the Zener diode 66. In this situation the diode 70 is no longer reverse biased and it prevents an input signal reaching the block 41 so that adjustment of the timing does not take place.

I claim:

1. A liquid fuel pumping apparatus for supplying fuel to an internal combustion engine the apparatus comprising an injection pump adapted to be driven by an associated engine for supplying fuel to at least one injector in timed relationship to the engine, first means for adjusting the quantity of fuel supplied to the engine at each injection stroke of the injection pump, second means operable to adjust the timing of delivery of fuel by the injection pump, third means for providing an electrical signal indicative of the actual instant at which delivery of fuel takes place to the engine, fourth means for supplying a periodic signal indicative of the position of the parts of the engine, and control circuit means, responsive to said signals, for controlling said second means and adjusting the timing of delivery of fuel by the pump to the engine.

2. An apparatus as claimed in claim 1 including a speed transducer for supplying to the control circuit an electrical signal representing the speed of the engine.

3. An apparatus as claimed in claim 2 including a further transducer for supplying to the control circuit an electrical signal representing the quantity of fuel supplied to the engine.

4. An apparatus as claimed in claim 3 in which said third means comprises a transducer associated with an injection nozzle of the engine.

5. An apparatus as claimed in claim 4 in which said second means comprises an electrical torque motor which is operatively coupled to a control valve of a hydraulic follow-up servo system.

6. An apparatus as claimed in claim 3 in which said control circuit includes a first adder for combining the signals produced by said speed transducer and said further transducer to provide a main command signal for controlling said second means.

7. An apparatus as claimed in claim 6 in which the control circuit includes a further adder which combines said main command signal with an error signal derived from said third and fourth means, the resultant signal being utilized to control said second means.

8. A liquid fuel pumping apparatus for supplying fuel to an internal combustion engine the apparatus comprising an injection pump adapted to be driven by an associated engine for supplying fuel in timed relationship to the engine, first means for adjusting the quantity of fuel supply to the engine at each injection stroke of the injection pump, second means operable to adjust the timing of delivery of fuel by the injection pump, the third means for providing an electrical signal indicative of the actual instant at which delivery of fuel takes place to the engine and fourth means for supplying to a control circuit a periodic signal indicative of the position of the parts of the engine, said control circuit upon the receipt of said signals acting if the timing of injection of fuel is incorrect, to control said second means to adjust the timing of delivery of fuel by the pump to the engine, said apparatus including a speed transducer for supplying to the control circuit an electrical signal representing the speed of the engine, including a further transducer for supplying to the control circuit an electrical signal representing the quantity of fuel supplied to the engine, said control circuit comprising a first adder for combining the signals produced by said speed transducer and said further transducer to provide a main command signal for controlling said second means, a further adder which combines said main command signal with an error signal derived from said third and fourth means, the resultant signal being utilized to control said second means, said control switch circuit further comprising a timing circuit the initiation of operation of which is controlled by the signal from said fourth means and the cessation of operation of which is controlled by the signal from said third means, the control circuit including a multiplier which is supplied with signals from said timing circuit and the speed transducer to provide a timing signal the value of which in terms of degrees of engine rotation, is representative of the time between the generation of the signal by the third and fourth means, the timing signal being amplified to provide said error signal.

9. An apparatus as claimed in claim 8 in which the control circuit included circuit means for introducing a time constant between the amplifier and said further adder.

10. An apparatus as claimed in claim 8 in which the control circuit includes a mute circuit operable in the event of there being no signal from said third means to reduce said error signal to zero.

11. An apparatus as claimed in claim 8 in which the control circuit includes a memory circuit intermediate said multiplier and said further adder.

* * * * *